(12) United States Patent
Tsuchinaga

(10) Patent No.: US 7,417,821 B2
(45) Date of Patent: Aug. 26, 2008

(54) INFORMATION RECORDING APPARATUS

(75) Inventor: Hiroyuki Tsuchinaga, Tokyo (JP)

(73) Assignee: Hitachi Global Storage Technnologies Netherlands B.V., Amsterdam (NL)

(*) Notice: Subject to any disclaimer, the term of this patent is extended or adjusted under 35 U.S.C. 154(b) by 0 days.

(21) Appl. No.: 11/726,080

(22) Filed: Mar. 20, 2007

(65) Prior Publication Data

US 2007/0223132 A1    Sep. 27, 2007

(30) Foreign Application Priority Data

Mar. 24, 2006    (JP)  ............... 2006-083830

(51) Int. Cl.
*G11B 5/596* (2006.01)
(52) U.S. Cl. ............... 360/78.04; 360/77.02
(58) Field of Classification Search ............ None
See application file for complete search history.

(56) References Cited

U.S. PATENT DOCUMENTS

2004/0080859 A1*  4/2004  Teo et al. .......... 360/77.02
2004/0136109 A1*  7/2004  Kusumoto et al. ...... 360/78.04

FOREIGN PATENT DOCUMENTS

JP    3689638 B2    8/2005

* cited by examiner

*Primary Examiner*—Jason C Olson
(74) *Attorney, Agent, or Firm*—Townsend and Townsend and Crew LLP; Patrick Duncan

(57) ABSTRACT

According to embodiments of the present invention, tracks can be formed on a magnetic recording medium on a zonal area at intervals of either a first track pitch or a second track pitch, both of which differ from each other. For a reference track defined in each zonal area, regardless of whether tracks are formed with the first track pitch or the second track pitch, the first track pitch and the second track pitch are specified so that a head position at the time of writing or reading information to or from the reference track, is common to both of the first track pitch and the second track pitch.

2 Claims, 6 Drawing Sheets

To host

Band unit N
Band unit N-1
Band unit 1

| Band identifier | First track | First band unit | Track pitch |
|---|---|---|---|
| 0 | 0 | 0 | TPw |
| 1 | 4000 | 1000 | TPn |
| 2 | 8000 | 1800 | TPw |
| 3 | 12000 | 2800 | TPn |
| 4 | 16000 | 3600 | TPw |

Fig.5

| Band unit | Write head position | Read head position |
|---|---|---|
| 0 | WTw (0) | RDw (0) |
| 1 | WTw (4) | RDw (4) |
| 2 | WTw (8) | RDw (8) |
| ⋮ | ⋮ | ⋮ |
| N | WTw (4N) | RDw (4N) |

Fig.6

| Track number | Sector number |
|---|---|
| a a a a | b b b b |
| c c c c | d d d d |
| ⋮ | ⋮ |

Tracks, each of which includes a defective sector

Tracks, each of which includes a defective sector

INFORMATION RECORDING APPARATUS

CROSS-REFERENCE TO RELATED APPLICATION

The instant nonprovisional patent application claims priority to Japanese Application 2006-083830, filed Mar. 24, 2006 and incorporated by reference in its entirety herein for all purposes.

BACKGROUND OF THE INVENTION

In recent years, various kinds of devices have been equipped with a hard disk. For example, portable music players and car navigation systems are equipped with a hard disk. Under the circumstances, a shingle write method is known as one of techniques for increasing the storage capacity for information with the size of a hard disk itself being miniaturized. In this method, data is successively written to a data track with part of the data track being overwritten by an adjacent data track from the inner circumferential side to the outer circumferential side on a recording medium so that the data tracks form a pattern like shingles. As a result, it is possible to realize a data track narrower than the recording width required to actually make a write by a magnetic head.

However, even in the case of hard disk drives adopting the shingle write method, it is often desirable that tracks be formed according to the shingle write method on part of a recording medium, whereas tracks are formed at intervals of normal track pitch on the rest of the recording medium. To be more specific, for example, sequential data is written to the tracks that are formed according to the shingle write method, (for example, video stream data), whereas data that should be randomly accessed is written to the tracks that are formed according to the normal track pitch.

Incidentally, for example, patent document 1 (Japanese Patent No. 36896338) discloses such an example in which a plurality of areas, each of which is constituted of tracks formed with the track pitch that differs from the other, are formed.

However, in the art described above, how to perform addressing for each of the plurality of areas, each of which is constituted of tracks formed with the track pitch that differs from the other, is not disclosed. In such a case, according to the conventional technique, addressing information must be set on a track format basis, and accordingly the position control of a read head or a write head must be performed on a track format basis. As a result, the configuration and control of an apparatus become complicated. In addition, the inspection and reference of the apparatus before shipment must also be performed on a track format basis, which makes the manufacturing process complicated.

BRIEF SUMMARY OF THE INVENTION

According to embodiments of the present invention, tracks can be formed on a magnetic recording medium on a zonal area at intervals of either a first track pitch or a second track pitch, both of which differ from each other. For a reference track defined in each zonal area, regardless of whether tracks are formed with the first track pitch or the second track pitch, the first track pitch and the second track pitch are specified so that a head position at the time of writing or reading information to or from the reference track, is common to both of the first track pitch and the second track pitch.

BRIEF DESCRIPTION OF THE DRAWINGS

FIG. 5 is a diagram illustrating an example of contents of a track address table included in an information recording apparatus according to an embodiment of the present invention.

FIG. 6 is a diagram illustrating an example of contents of a defect table included in an information recording apparatus according to an embodiment of the present invention.

DETAILED DESCRIPTION OF THE INVENTION

Embodiments in accordance with the present invention relate to an information recording apparatus such as a hard disk drive. An object of embodiments in accordance with the present invention is to provide an information recording apparatus that is capable of writing/reading information to/from a plurality of areas, each of which includes tracks formed with a track pitch that differs from the other, with a simple and easy configuration, and that is thereby capable of preventing the manufacturing process thereof from becoming complicated.

According to one aspect of embodiments of the present invention, there is provided an information recording apparatus, the information recording apparatus comprising: a magnetic recording medium; a head for writing/reading information to/from the magnetic recording medium; a storage unit; and a controller. Tracks are formed on the magnetic recording medium, said tracks being formed on a zonal area at intervals of either a first track pitch or a second track pitch, both of which differ from each other, and, for a reference track defined in said each zonal area, regardless of whether tracks are formed with the first track pitch or the second track pitch in said each zonal area, the first track pitch and the second track pitch are specified so that a position of the head at the time of writing or reading information to or from the reference track is common to the first track pitch and the second track pitch; wherein said storage unit stores a track address table that specifies a position of the head at the time of writing information to an reference track of each zonal area in which tracks are formed with the first track pitch, and a position of the head at the time of reading information from a reference track of each zonal area in which tracks are formed with the first track pitch; and wherein if a track, which is specified as a target track to or from which information is written or read, is included in a zonal area in which tracks are formed with the second track pitch, said controller determines, through arithmetic operation, a position of the head at the time of writing or reading information to or from the specified track on the basis of information stored in the track address table.

Thus, on the basis of a track address table corresponding to the specific track pitch, by determining, through arithmetic operation, a head position in each zonal area in which tracks are formed with the different track pitch, it is possible to make the configuration and control of an apparatus simple and easy, and thereby to prevent the manufacturing process from becoming complicated.

Figure 1:
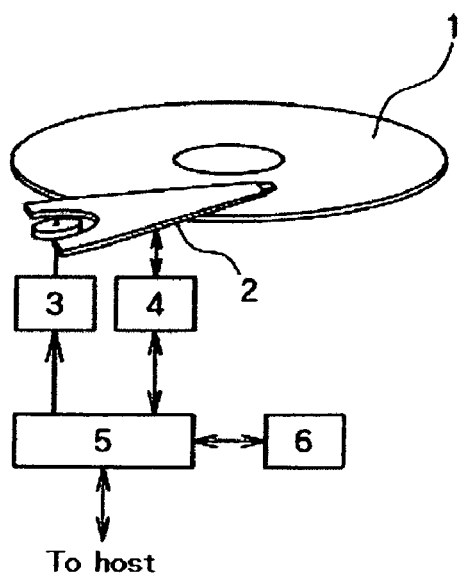
FIG. 1 is a diagram schematically illustrating an example of a configuration of an information recording apparatus according to an embodiment of the present invention.

Embodiments of the present invention will be described with reference to drawings as below. An information recording apparatus according to this embodiment is, for example, a hard disk. As shown in FIG. 1, the information recording apparatus includes a magnetic recording medium 1, a head unit 2, a head driving controller 3, a read/write (RW) unit 4, a controller 5, and a storage unit 6.

Figure 2:
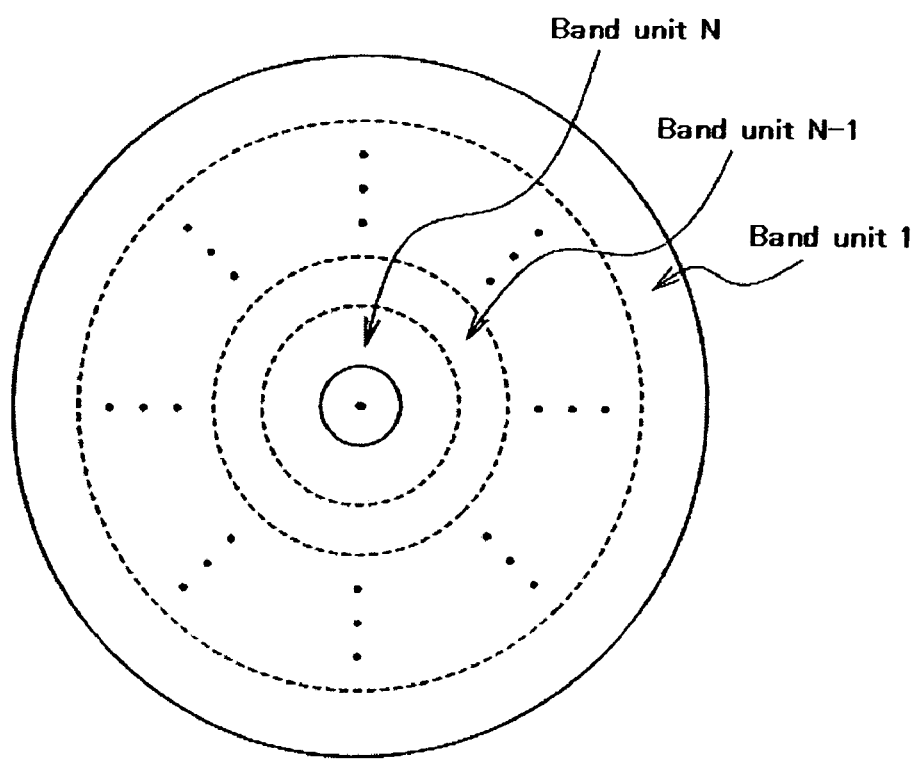
FIG. 2 is a diagram illustrating an example of a zonal area formed on a magnetic recording medium of an information recording apparatus according to an embodiment of the present invention.

The magnetic recording medium 1 is a disc-like magnetic recording medium. This magnetic recording medium 1 is supported by a supporting section so that the magnetic recording medium 1 can rotate about the disk center thereof as a rotation center. This supporting section is secured to a base of a case. As shown in FIG. 2, the magnetic recording medium 1 according to this embodiment is partitioned into concentric band units. In addition, in each of the band units, for example, a plurality of data tracks are concentrically formed. FIG. 2 is a diagram illustrating as an example a case where N band units are formed.

Incidentally, in this embodiment, a plurality track pitch candidates are defined beforehand. Here, for the sake of description, it is assumed that two track pitch candidates, a first track pitch TPw and a second track pitch TPn, which differ from each other, are defined. In addition, it is assumed that TPw>TWw>TPn. In this case, TWw is the write width of a write head included in the head unit 2. Here, TPn is narrower than TWw; and TPn is the track pitch based on the shingle write method.

The track pitch with which tracks are formed on the magnetic recording medium 1 is selected from among the plurality of track pitch candidates on a band unit basis. In addition, tracks are formed at regular intervals in each band unit. To be more specific, a head position at the time of writing to, or reading from, a track formed with the first track pitch TPw coincides with a head position at the time of writing to, or reading from, a track formed with the second track pitch TPn at least on a band-unit interval basis (here, this track is designated as a reference track). In other words, a disk drive, which uses two or more kinds of physical track address information (hereinafter, unless it is necessary to distinguish between a physical track address and a logical track address, the physical track address information is merely called track address information), is so devised that disk radius positions of track addresses of the tracks, which are formed with the first and second track pitch TPw and TPn respectively, coincide with each other at intervals of a constant period. In further words, the relationship between the first track pitch TPw and the second track pitch TPn corresponds to a ratio of integer numbers.

Moreover, band units, each of which is constituted of tracks formed with the same track pitch, may also be adjacently formed in succession. In the following description, an area in which band units, each of which is constituted of tracks formed with the first track pitch TPw, are consecutively located is called a first band; and an area in which band units, each of which is constituted of tracks formed with the second track pitch TPn, are consecutively located is called a second band.

The head unit 2 includes at least one head assembly. As roughly shown in FIG. 3, this head assembly includes: heads 21, each of which is associated with each recording surface of the magnetic recording medium 1; and arms 22, each of which supports each of the heads 21. The head unit 2 is supported so that the head unit 2 can pivotally move about the center of rotation C of a voice coil motor. Each of the heads 21 includes a write head 21w and a read head 21r.

According to an instruction inputted from the control unit 5, the head driving controller 3 drives the voice coil motor to control positions of the write head 21w and the read head 21r included in the head unit 2. The RW unit 4 performs specified processing, such as decoding, for information read out from the recording medium 1 by the read head 21r included in each of the heads 21, and then outputs the information to the control unit 5. In addition, this RW unit 4 performs specified processing (for example, encoding) for information to be written, which is inputted from the control unit 5. Then, the RW unit 4 writes the information to the magnetic recording medium 1 through the write head 21w included in each of the heads 21.

The controller 5 is, for example, a microcomputer. The controller operates according to a program stored in the storage unit 6. The controller 5 is connected to, for example, a computer that is used as a host. The controller 5 generates and outputs an instruction to be given to the head driving controller 3 according to an instruction received from the host side. Then, the controller 5 controls each of the heads 21 so that the head 21 is moved to a position at which information requested by the host is written on the magnetic recording medium 1, and outputs, to the host, information that is output by the RW unit 4. Moreover, the controller 5 generates and outputs an instruction to be given to the head driving controller 3 according to a write request from the host, and thereby controls each of the heads 21 so that the head 21 is moved to a position at which information is to be written, and also outputs, to the RW unit 4, the information to be written. Operation of this control part 5 will be described in detail later.

The storage unit 6 includes a storage element such as a RAM and a ROM. The storage unit 6 stores a program that is executed by the controller 5. In addition, a track address table is stored in this storage unit 6.

Figures 3, 4:
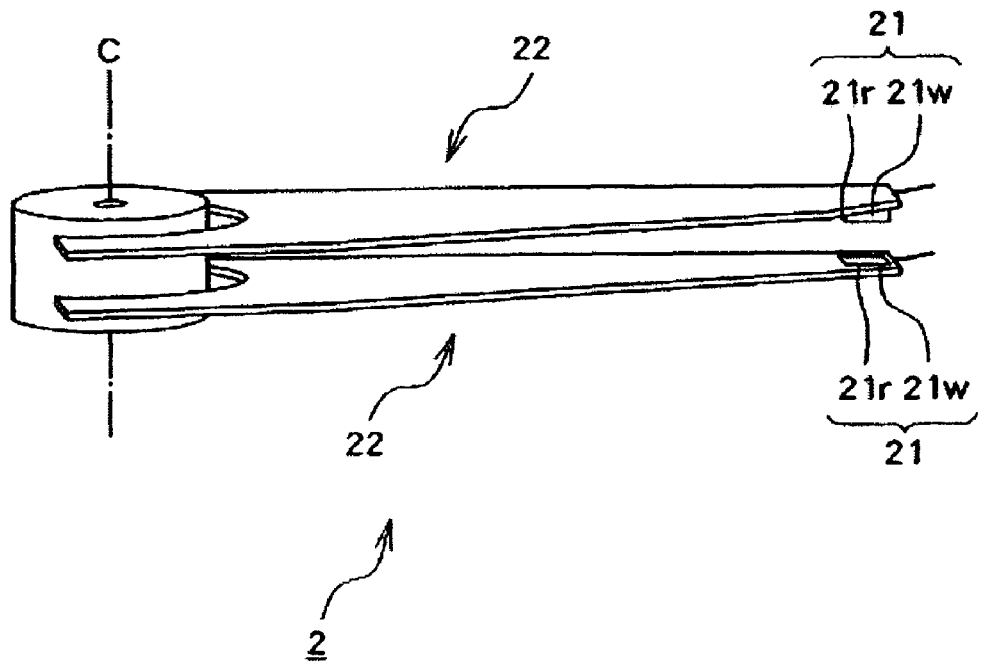
FIG. 3 is a schematic diagram illustrating an example of a configuration of a head of an information recording apparatus according to an embodiment of the present invention.
FIG. 4 is a diagram illustrating an example of contents of a band table included in an information recording apparatus according to an embodiment of the present invention.

According to this embodiment, an identification number is assigned to each band unit beforehand. As shown in FIG. 4, every time the first band is replaced with the second band, a band table in which an identifier of each band, an identification number of a first band unit included in the band, a track number of a first track in the first band unit included in the band, and the track pitch adopted in the band unit included in the band are associated with one another is stored in the storage unit 6. Described below as an example is a case where if tracks are formed with the first track pitch TPw, four tracks can be formed in each band unit, whereas if tracks are formed with the second track pitch TPn, five tracks can be formed in each band unit.

Accordingly, in the first band (the band identifier thereof is 0), four tracks are formed in each of 1000 band units ranging from the first band unit "0" to a band unit "999". A track number assigned to a first track formed in the subsequent band unit is 4000, which is the product of the above numbers, more specifically, the product of the number of tracks formed in each band unit and the number of band units.

Therefore, in the second band (the band identifier thereof is 1), a track number of a first track is "4000", and an identification number of a first band unit is "1000". Here, because five tracks are formed in each of 800 band units ranging from band units "1000" to band units "1799", a track number of a first track in the subsequent band unit is "8000", which is obtained by adding 4000 (800×5) to 4000. The rest of this band table is generated in like manner.

In addition, this storage unit 6 also stores a track address table used to specify, on a track to be accessed, a position of the head in the radial direction of the magnetic recording medium 1. In this embodiment, the stored track address table is based on a case where tracks are virtually formed in a manner that for all band units formed on the magnetic recording medium 1, the distance between adjacent tracks becomes the first track pitch TPw. In this example, as shown in FIG. 5, head position information (WTw) at the time of positioning the write head at a first track of a band unit (a track that is assumed to be formed with the first track pitch TPw) is associated with head position information (RDw) at the time of positioning the read head at the first track of the band unit (the track that is assumed to be formed with the first track pitch TPw) on a band unit basis.

Moreover, this storage unit 6 stores, as a defective sector table (a primary defect table (PDM)), a table in which sets of a track number and a sector number are listed to indicate defective sectors as shown in FIG. 6.

Figure 7:
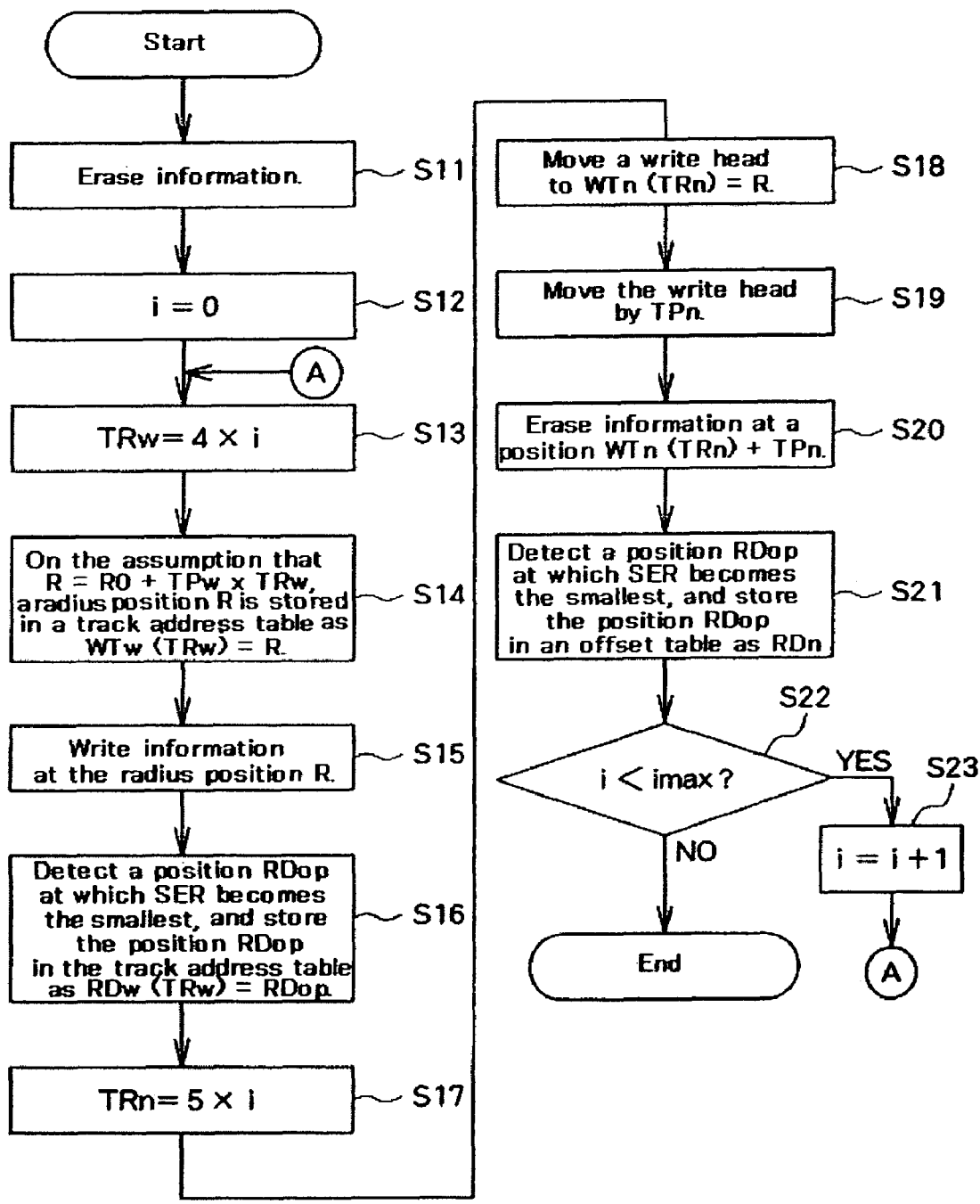
FIG. 7 is a flowchart illustrating an example of a process of generating a track address table and an offset table in an information recording apparatus according to an embodiment of the present invention.

Here, operation of the controller 5 will be described. First of all, reference processing, which is executed by the controller 5 at the time of the initialization of the magnetic recording medium 1, will be described. As shown in FIG. 7, in this reference processing, the magnetic recording medium 1 is first initialized to erase written information (S11). In addition, information about the track pitch TPw, TPn, which is stored in the storage unit 6 beforehand, is read out from the storage unit 6. Here, it is assumed that the relationship between the track pitch TPw and the track pitch TPn is a ratio of integer numbers. The description below is based on the assumption that if tracks are formed with the first track pitch TPw, the number of tracks which can be formed in one band unit is four, whereas if tracks are formed with the second track pitch TPn, the number of tracks which can be formed in one band unit is five. In short, TPw:TPn=5:4.

The controller 5 initializes a variable i indicating a number of a band unit to be "0" (S12). The controller 5 then calculates a variable TRw using the equation of: TRw=4×i (S13). The variable TRw indicates a track number of a track that is formed with the first track pitch TPw. Next, the controller 5 calculates a radius position R (the distance R from the rotation center) on the magnetic recording medium 1 using the equation of: R=R0+TPw×TRw. Here, R0 is a radius position of the write head 21w at the time of writing information to a track formed on the innermost circumferential side of the magnetic recording medium 1. Then, the controller 5 stores this R in the storage unit 6 as a radius position WTw (TRw) of the write head 21w at the time of writing information to a track having a track number TRw (S14).

The controller 5 performs a control to move the write head 21w to this radius position R to write specified information (S15). In addition, the controller 5 makes initial settings so that the center of the read head 21r becomes the radius position R. The controller 5 then measures an error rate (SER) of a read signal with the radius position of the read head 21r being moved within a range of the first track pitch TPw. Next, the controller 5 detects a radius position RDop at which this error rate (SER) becomes the smallest, and then stores the radius position RDop in the storage unit 6 as a radius position RDw (TRw) of the read head 21r at the time of reading information from a track having a track number TRw (S16).

Moreover, in this embodiment, tracks which are formed with the first track pitch are not based on the shingle write method. On the other hand, tracks which are formed with the second track pitch are based on the shingle write method. Therefore, the difference in position between the write head 21w and the read head 21r at the time of accessing a certain track formed with the first track pitch differs from that at the time of accessing a certain track formed with the second track pitch. For this reason, it is necessary to separately specify an offset at the time of accessing a track formed with the second track pitch (described here is an offset at the time of reading the track). In this embodiment, an offset at the time of accessing a track formed with the second track pitch by use of the track formed in the step S15 is specified. To be more specific, the controller 5 calculates an variable TRn, which indicates a track number of a track formed with the second track pitch TPn, using the equation of: TRn=5×i (S17).

After that, the controller 5 sets WTn (TRn) at R (S18), which was calculated in the step S14. The controller 5 then calculates a position which is moved from this radius position by TPn using the equation of: WTn (TRn)+TPn=R+TPn (S19). Then, the controller 5 performs a control to move the write head 21w to the radius position of R+TPn to erase written information (S20). Thus, in order to set a position of the magnetic head with respect to a track formed with the first track pitch TPw, the track written in the step S15 is partially erased to form a track formed with the second track pitch. The controller 5 performs a control to move a radius position of the read head 21r to a position of R+TPn/2, and measures an error rate (SER) of a read signal with the radius position being moved within a range of the second track pitch TPn. Next, the controller 5 detects a radius position RDop at which this error rate (SER) becomes the smallest, and then stores the radius position RDop in the storage unit 6 as a radius position RDn (TRn) of the read head 21r at the time of reading information from a track having a track number TRn, which is formed with the second track pitch TPn (S21).

The controller 5 judges whether or not a value of the variable i indicating a band unit number is smaller than the maximum value imax (S22). If the controller 5 is judged that i<imax, the controller 5 increments i by one (S23). Then, the process returns to the step S13 to continue the processing (A).

As a result of the processing described above, for the tracks formed with the first track pitch TPw, a radius position of the write head 21w at the time of writing information, and a radius position of the read head 21r at the time of reading information from each reference track, are calculated for tracks, each of which has a track number of a multiple of 4, that is to say, TRw=0, 4, 8 . . . (more specifically, a multiple of the number of tracks formed in a band unit). Hereinafter, the tracks, each of which has a track number of a multiple of 4, are called reference tracks of the first track pitch. On the other hand, for the tracks formed with the second track pitch TPn, a radius position of the write head 21w at the time of writing information, and a radius position of the read head 21r at the time of reading information from each reference track, are calculated for tracks, each of which has a track number of a multiple of 5, that is to say, TRn=0, 5, 10 . . . (more specifically, a multiple of the number of tracks formed in a band unit). Hereinafter, the tracks, each of which has a track number of a multiple of 5, are called reference tracks of the second track pitch. In the step S22, unless i<imax, the processing ends.

According to this example, a specified signal is written to a reference track with the first track pitch which is relatively wide track pitch so that a radius position of the read head $21r$ in the reference track is determined. Next, the write head $21w$ is moved from the reference track by the second track pitch which is relatively narrow track pitch to erase the signal so that an reference track is formed with the second track pitch. Then, a radius position of the read head $21r$ associated with the reference track formed with the second track pitch is determined. To be more specific, by partially erasing the signal, which has been written to determine a position of the head 21 at the time of writing/reading with respect to a track formed with the first track pitch, so as to determine an offset at the time of reading from a track formed with the second track pitch, it is possible to reduce a load of rewriting for the formation of a track with the second track pitch.

Incidentally, although the example in which a radius position of the read head $21r$ is determined with reference to a radius position of the write head $21w$ as a reference track was described above, the radius position of the write head $21w$ may also be determined with reference to a radius position of the read head $21r$.

Figures 8, 9:
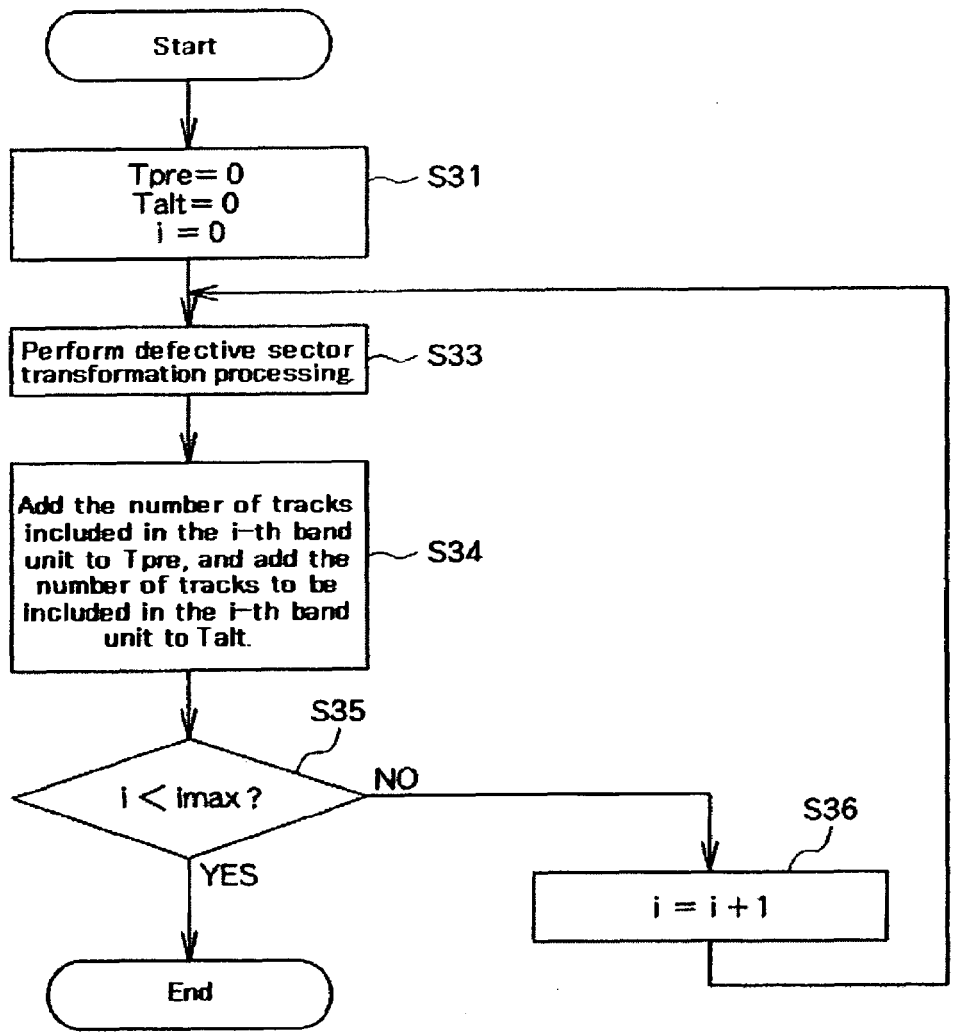
FIG. 8 is a diagram illustrating an example of contents of an offset table included in an information recording apparatus according to an embodiment of the present invention.
FIG. 9 is a flowchart illustrating an example of a process of transforming each defective sector in an information recording apparatus according to an embodiment of the present invention.

As a result of the above processing, the following information is stored in the storage unit 6 on a band unit basis:
(1) a radius position of the write head $21w$, and that of the read head $21r$, associated with each reference track of the first track pitch (FIG. 5); and
(2) a radius position of the read head $21r$ associated with each reference track of the second track pitch (offset table) (FIG. 8).

Next, the position control of each of the heads 21 carried out by the controller 5 will be described. According to an information read instruction inputted from the host side, the controller 5 performs a control to move the head 21 to a track to which target information to be read is written as below. Here, the read instruction includes a track number Ttarget of a track to which target information to be read is written.

With reference to the band table shown in FIG. 4, the controller 5 identifies a band to which a target track number Ttarget belongs. For example, if Ttarget=4567, it is judged from the table shown in FIG. 4 that a track having the track number Ttarget belongs to the first band. Next, because this band is based on the second track pitch (each band unit is constituted of five tracks), a first track number of the band to which the track having the track number Ttarget belongs is subtracted from Ttarget, and the result is divided by the number of tracks per band unit (in this case, 5) as follows:

(4567−4000)/5

The quotient of the above calculation is "113"; and the remainder thereof is "2". Accordingly, by adding a first band unit number "1000" of the first band to this quotient, a band unit to which the track having the track number Ttarget (=4567) belongs is determined to be "1113". In addition, because the remainder is 2, the track having the track number Ttarget is the third track of the 1113th band unit (because the remainder always becomes 0 when the first track of each band unit is targeted).

Accordingly, the controller 5 reads out, from the storage unit 6, information about a radius position of the read head $21r$ associated with a reference track of the 1113th band unit. The controller 5 then calculates a radius position of the read head $21r$ associated with the track number Ttarget (=4567) as follows: RDn (4567)=RDn (4565)+2×TPn. Incidentally, "4565" is a track number of a reference track of the band unit to which the track having the track number 4567 belongs. The controller 5 instructs the head driving controller 3 to move the read head $21r$ to the radius position RDn (4567) that has been calculated here.

According to the instruction by the controller 5, the head driving controller 3 moves the read head $21r$ from the rotation center of the magnetic recording medium 1 to a position (radius position) of the radius RDn (4567). After that, the RW unit 4 amplifies and decodes information that has been read out from the magnetic recording medium 1 by the read head $21r$, and outputs the information to the controller 5. The controller 5 outputs the information to the host.

On the other hand, on the receipt of an information write instruction from the host side, the controller 5 operates as below. Here, the write instruction also includes a track number Ttarget of a track to which information is to be written.

With reference to the band table shown in FIG. 4, the controller 5 identifies a band to which a target track number Ttarget belongs. For example, if Ttarget=4567, as is the case with the receipt of the information read instruction, a band unit (1113) to which a track having the track number Ttarget (=4567) belongs, and information indicating the number of tracks in this band unit, that is to say, the remainder (2), are calculated.

Here, because information about a radius position of the write head $21w$ associated with a reference track of the second track pitch is not stored in the storage unit 6, the controller 5 reads out, from the storage unit 6, information WTw (4565) about a radius position of the write head $21w$ associated with a reference track of the first track pitch in the 1113th band unit. The controller 5 then calculates a radius position of the write head $21w$ associated with the track number Ttarget (=4567) as follows: WTn (4567)=WTw (4565)+2×TPn. The controller 5 instructs the head driving controller 3 to move the write head $21w$ to the radius position WTn (4567) that has been calculated here.

According to the instruction by the controller 5, the head driving controller 3 moves the write head $21w$ from the rotation center of the magnetic recording medium 1 to a position (radius position) of the radius WTn (4567). The RW unit 4 encodes and amplifies information inputted from the host as a target to be written, and the information is then written to the magnetic recording medium 1 by the write head $21w$.

Thus, in this embodiment, radius positions of the read head $21r$ and the write head $21w$ associated with each of tracks other than reference tracks are determined by the interpolation calculation relative to a reference track.

Incidentally, although the case where a track formed with the second track pitch is accessed was described above, a case where a track formed with the first track pitch is accessed is also substantially the same. For example, if the controller 5 receives from the host an instruction to write or read information to or from a track having a track number Ttarget (=1234), it is judged from the table shown in FIG. 4 that the track having the track number Ttarget belongs to a zeroth band. Moreover, because this band is based on the first track pitch (each band unit is constituted of four tracks), a first track number of the band to which the track having the track number Ttarget belongs is subtracted from Ttarget, and the result is divided by the number of tracks per band unit (in this case, 4) as follows:

(1234−0)/4

The quotient of the above calculation is "308"; and the remainder thereof is "2". Accordingly, by adding a first band unit number "0" of the zeroth band to this quotient, a band unit to which the track having the track number Ttarget (=1234) belongs is determined to be "308". In addition, because the remainder is 2, the track having the track number Ttarget is the third track of the 308th band unit.

Accordingly, if the instruction received from the host is a read instruction, the controller 5 reads out, from the storage unit 6, information about a radius position of the read head 21r associated with a reference track of the 308th band unit. The controller 5 then calculates a radius position of the read head 21r corresponding to the track number Ttarget (=1232) as follows: RDw (1234)=RDw (1232)+2×TPw.

Incidentally, "1232" is a track number of a reference track of the band unit to which the track having the track number 1234belongs. The controller 5 instructs the head driving controller 3 to move the read head 21r to the radius position RDw (1234) that has been calculated here.

In addition, if the instruction received from the host is a write instruction, the controller 5 reads out, from the storage unit 6, information about a radius position of the write head 21w associated with a reference track of the 308th band unit. The controller 5 then calculates a radius position of the write head 21w corresponding to the track number Ttarget (=1234) as follows: WTw (1234)=WTw (1232)+2×TPw.

Incidentally, "1232" is a track number of a reference track of the band unit to which the track having the track number 1234 belongs. The controller 5 instructs the head driving controller 3 to move the write head 21w to the radius position WTw (1234) that has been calculated here.

If a track to be accessed includes a defective sector, the controller 5 uses a defective sector table to perform the step of: skipping the defective sector so that the defective sector is not used (more specifically, the defective sector is not used as a sector to which information is written); or writing, to a predetermined spare sector, information that should be written to the defective sector, or reading out, from a predetermined spare sector, information that should be read out from the defective sector.

In this embodiment, the track number is successively incremented from the outer circumferential side to the inner circumferential side of the magnetic recording medium 1. Therefore, in an area in which a band of the first track pitch, which is the track pitch that is not subjected to shingle write, is located at a position adjacent to the inner circumference of a band of the second track pitch, which is the track pitch that is subjected to shingle write, the last track. (the innermost circumferential track) included in the band of the second track pitch is treated as a dummy track, and all sectors included in the dummy track are stored in the defective sector table beforehand. This makes it possible to prevent the first track of the adjacent band (formed with the first track pitch) from being partially erased when a shingle write is made to the innermost track (formed with the second track pitch) in the band of the second track pitch.

Thus, if the defective sector table is configured to include a dummy track, it is desirable that a sector (essentially, a non-defective sector), which is stored in the defective sector table as the dummy track, can be reused at the time of changing a physical format (hereinafter, it is merely called a format). For this reason, a reuse flag information, which indicates whether or not the dummy track is reused at the time of changing the format, may also be stored in the defective sector table with the reuse flag information being associated with information for identifying a track and a sector that are not used.

Moreover, in this embodiment, the track pitch in each band unit can be properly set at the time of formatting, or the like. Described next will be processing of the controller 5 performed when settings of the track pitch are changed. In this processing, the controller 5 sets the defective sector table again. On the receipt of information that specifies the track pitch after formatting, the controller 5 operates as follows.

As shown in FIG. 9, the controller 5 sets all of a variable i indicating a band unit number, a variable Tpre indicating a track number before update, and a variable Talt indicating a track number after update at "0" (S31). After that, the controller 5 executes transformation processing of each defective sector. To be more specific, the controller 5 acquires information about the track pitch of the i-th band unit with reference to a band table stored in the storage unit 6, and then compares the acquired information with inputted information that specifies the track pitch. Here, if the specified track pitch coincides with a current state, the controller 5 refers to the defective sector table to search for a defective sector corresponding to tracks (track numbers Tpre, Tpre+1, . . . ) belonging to the i-th band unit. If a defective sector is found as a result of the search, a track number of a track corresponding to the found defective sector is updated to a track number after update (track numbers Talt, Talt+1, . . . ), and is written to the defective sector table after update (S33).

On the other hand, if the specified track pitch of the i-th band unit does not coincide with the settings in the band table in the step S33, the controller 5 refers to the defective sector table to search for a defective sector corresponding to tracks (track numbers Tpre, Tpre+1, . . . ) belonging to the i-th band unit. If a defective sector corresponding to the tracks belonging to the i-th band unit is found as a result of the search, the controller 5 acquires a track number Tq of a track that includes the defective sector. Then, with reference to a track address table, and/or an offset table, the controller 5 calculates a radius position of a boundary with a current track (before update). To be more specific, for example, a radius position R of the read head 21r at the time of reading information from the track having the track number Tq is calculated by processing that is similar to that at the time of reading information.

Here, if it is assumed that the i-th band unit is associated with the first track pitch in the band table, radius positions of the boundary are calculated as follows.

$$R-Tpw/2$$

$$R+Tpw/2$$

Figure 10:
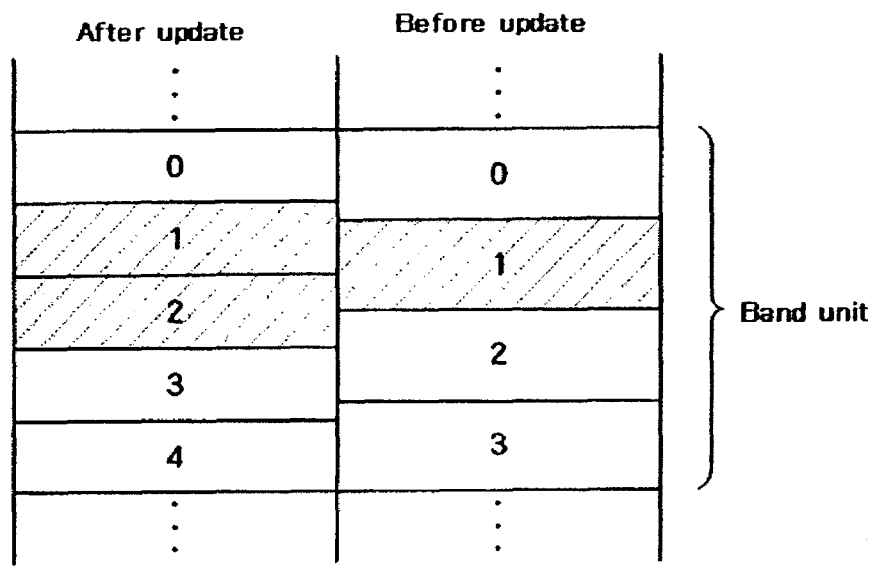
FIG. 10 is a diagram illustrating an example of how to transform each defective sector in an information recording apparatus according to an embodiment of the present invention.

Next, the controller 5 calculates a track number of at least one track (a track having a possibility of containing a defective part) relating to radius positions ranging from $R-Tpw/2$ to $R+Tpw/2$ in the i-th band unit after updating by the specification. If this embodiment is schematically described with reference to FIG. 10, even if the track pitch of tracks formed in each band unit changes, each boundary between band units does not change. For this reason, if a band unit of the first track pitch (the track pitch with which four tracks are formed per band unit) shown on the right side of FIG. 10 is updated to a band unit of the second track pitch (the track pitch with which five tracks are formed per band unit) shown on the left side of FIG. 10, if a defective sector exists in the first track, there is a possibility that among tracks formed with the second track pitch, the defective sector may be included in the first and second tracks that overlap with a boundary with the first track before update.

The controller 5, therefore, rewrites an entry of the track number Tq in the defective sector table as at least one entry for a track number having a possibility of containing the defective part. In the case of the example shown in FIG. 10, if a sector j included in the first track is a defective sector, an entry of "the track number 1, the sector j", and an entry of "the track number 2, the sector j" are generated on the basis of an entry of "the track number 1, the sector j" included in the defective sector table, and then the generated entries are written to the defective sector table after update.

Further, in a similar manner, if the i-th band unit before update is associated with the second track pitch, similar defective-sector transformation processing (step S33) is performed after calculating radius positions of a boundary as follows.

R−Tpn/2

R+Tpn/2

Figure 11:
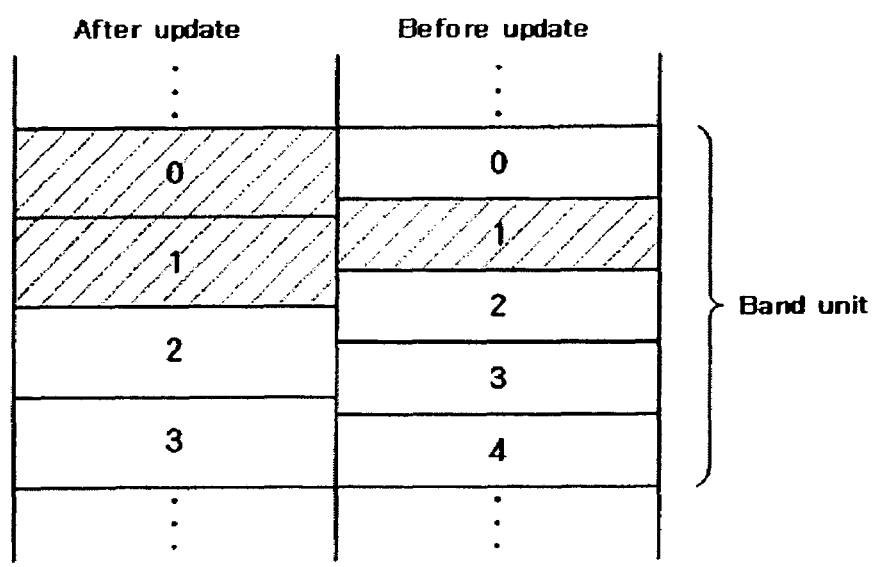
FIG. 11 is a diagram illustrating another example of how to transform each defective sector in an information recording apparatus according to an embodiment of the present invention.

Thus, even if the conversion from the relatively narrow track pitch to the relatively wide track pitch is made, there is a case where an original track before update overlaps with two tracks after update as shown in FIG. 11. Incidentally, for the sake of convenience of description only, each of FIGS. 10 and 11 illustrates a state in which tracks, each of which is formed with the track pitch that differs from the other, are adjacent to each other in the circumference direction. However, in actuality, such a format is not realistic.

Next, the controller 5 adds the number of tracks before update included in the i-th band unit to the track number Tpre, and adds the number of tracks after update to be included in the i-th band unit to the track number Talt (S34), so as to check whether or not the i-th band unit is the last band unit (that is to say, the innermost circumferential band unit) (S35). If it is judged that the i-th band unit is not the last band unit, i is incremented by one (S36), and then the process returns to the step S33 to continue the processing. On the other hand, if it is judged in the step S35 that the i-th band unit is the last band unit, the processing ends.

As a result of the transformation processing of the defective sector table, even if the track pitch in a band unit is changed, information about defective sectors is kept unchanged. Incidentally, in the transformation processing of the defective sector table, if a reuse flag is given to an entry of a defective sector before update (if the entry of the defective sector before update is set for the sake of convenience so that a dummy track is formed), an entry of the defective sector after update corresponding to the entry is not included in the defective sector table after update.

On the completion of update processing of updating the defective sector table, the controller 5 overwrites the defective sector table before update stored in the storage unit 6 with the defective sector table after update. Information is written/read on the basis of the defective sector table after update thereafter.

According to the information recording apparatus in this embodiment, even if a plurality of track formats coexist in the magnetic recording medium 1, addressing information about one of the track formats is set. If the position control of the read head, or that of the write head, is performed in a track formed with a track format that differs from the track format for the settings, addressing information about a track format, which differs from the set addressing information, is generated by means of calculation based on the set addressing information, and thereby the position control of the head is performed. This makes it possible to simplify the configuration and control of an apparatus. Moreover, the inspection and reference before shipment also have to be performed for one track format about which addressing information is set. Accordingly, it is possible to make the manufacturing process simple and easy. To be more specific, according to this embodiment, it is possible to write/read information to/from a plurality of areas, each of which is constituted of tracks formed with the track pitch that differs from one another, by use of a simple and easy configuration. As a result, it is possible to prevent the manufacturing process from becoming complicated.

What is claimed is:

1. An information recording apparatus, comprising:
   a magnetic recording medium;
   a head for writing/reading information to/from the magnetic recording medium;
   a storage unit; and
   a controller;
   wherein tracks are formed on the magnetic recording medium, said tracks being formed on a zonal area at intervals of either a first track pitch or a second track pitch, both of which differ from each other, and, for a reference track defined in said each zonal area, regardless of whether tracks are formed with the first track pitch or the second track pitch in said each zonal area, the first track pitch and the second track pitch are specified so that a position of the head at the time of writing or reading information to or from the reference track is common to the first track pitch and the second track pitch;
   wherein said storage unit stores a table that specifies a position of the head at the time of writing information to a reference track of each zonal area in which tracks are formed with the first track pitch, and a position of the head at the time of reading information from a reference track of each zonal area in which tracks are formed with the first track pitch; and
   wherein if a track, which is specified as a target track to or from which information is written or read, is included in a zonal area in which tracks are formed with the second track pitch, said controller determines, through arithmetic operation, a position of the head at the time of writing or reading information to or from the specified track on the basis of information stored in said table.

2. The information recording apparatus according to claim 1, wherein:
   said second track pitch is the track pitch with which an attention track is partially overwritten by a track adjacent to the attention track;
   said controller generates said table on the basis of the tracks formed with the first track pitch; erases part of the reference track among the tracks formed with the first track pitch to form each track having the same width as that of the tracks formed with the second track pitch; determines a position of the head at the time of reading information from each track having the same width as that of the tracks formed with the second track pitch; and then stores the positions in the storage unit as an offset table; and
   if a track, which is specified as a target track from which information is read, is included in a zonal area in which tracks are formed with the second track pitch, the controller uses the offset table to determine a position of the head.

* * * * *